United States Patent
Hirsch

Patent Number: 5,748,809
Date of Patent: May 5, 1998

[54] ACTIVE AREA IDENTIFICATION ON A MACHINE READABLE FORM USING FORM LANDMARKS

[75] Inventor: David Edward Hirsch, Sunnyvale, Calif.

[73] Assignee: Xerox Corporation, Stamford, Conn.

[21] Appl. No.: 880,202

[22] Filed: Jun. 23, 1997

Related U.S. Application Data

[63] Continuation of Ser. No. 426,354, Apr. 21, 1995, abandoned.

[51] Int. Cl.$^6$ ........................................ G06K 9/20
[52] U.S. Cl. .................... 382/317; 382/175; 395/766
[58] Field of Search ................................ 382/317, 175, 382/180, 287, 292; 358/403, 453; 395/145–149, 766–769

[56] References Cited

U.S. PATENT DOCUMENTS

| | | | |
|---|---|---|---|
| 4,933,984 | 6/1990 | Nakano et al. | 382/317 |
| 5,060,980 | 10/1991 | Johnson et al. | 283/70 |
| 5,140,650 | 8/1992 | Casey et al. | 382/61 |
| 5,201,011 | 4/1993 | Bloomberg et al. | 382/9 |
| 5,282,052 | 1/1994 | Johnson et al. | 358/402 |
| 5,317,646 | 5/1994 | Sang, Jr. et al. | 382/9 |
| 5,386,298 | 1/1995 | Bronnenberg et al. | 358/403 |
| 5,416,849 | 5/1995 | Huang | 382/317 |
| 5,428,694 | 6/1995 | Betts et al. | 382/317 |
| 5,452,379 | 9/1995 | Poor | 382/317 |

*Primary Examiner*—Leo Boudreau
*Assistant Examiner*—Bhavesh Mehta
*Attorney, Agent, or Firm*—Richard B. Domingo

[57] ABSTRACT

A forms creation and processing system which identifies and locates the active areas of a form using forms landmarks. The present invention eliminates the need to place predefined registration marks onto a machine readable form. The active areas of a form are those which may contain a user created mark, such as a checkbox or a signature box. A form is preanalyzed at the same time that the active areas are being described. The aim of the preanalysis is to find a set of graphic shapes, i.e. landmarks, that can be found on the form independent of their location or orientation in the image. Examples of such landmarks include paragraphs of text, heavy black lines and gray scale areas. The analysis looks at the geometric distribution and regularities of the connected components to choose a set of landmarks. The landmarks and active areas on the form are stored in a forms control file. A forms interpreter uses the forms control file to locate and examine the active areas of an instance of a form to determine if a mark has been placed thereon.

14 Claims, 12 Drawing Sheets

ACTIVE AREA IDENTIFICATION ON A MACHINE READABLE FORM USING FORM LANDMARKS

This application is a continuation of application Ser. No. 08/426,354, filed Apr. 21, 1995, now abandoned.

FIELD OF THE INVENTION

The present invention relates to the field of processing machine readable forms, and in particular to the identification of areas on a machine readable form which may contain marks indicative of a desired action.

BACKGROUND OF THE INVENTION

Machine readable forms have been in common use for some time. Such forms provide a mechanism for enabling actions to be taken based on marks on a paper without requiring human intervention such as reading or interpreting the forms. The marks on such forms are extracted under the control of a device commonly referred to as a form interpreter. The forms are typically "read" by an optical scanner or the like, and the form interpreter then locates and characterizes the marks on the forms, and may take action, e.g. output control signals to peripheral devices as a function of the presence, location, nature, etc., of the marks.

A variety of techniques, such as check boxes, signature regions, and highlighting, have been developed to allow a form interpreter to read and interpret marks placed on a machine readable document. Using basic image processing techniques, marks made in designated areas (hereinafter referred to as "active areas") on the form can be read from a scanned image of the form, producing data that can be used as input to a data processing system. An example of a product using such form processing techniques is the PaperWorks TM product developed by the Xerox Corporation of Stamford, Conn.

Before the marks can be read and interpreted, they must be located on the form's scanned image. This can be difficult. The pre-printed graphics (if there are any) used to designate the active areas are rarely distinctive enough to be reliably identified in the scanned image by shape alone. For example, the small square boxes often used as check boxes look very similar to small cells in a table. For this reason, a form interpreter usually requires that the location of the active areas on a machine readable form be known in advance. However, even then, since the image of a form received from a scanner may be shifted significantly in both dimensions, or even stretched or rotated, the active areas may appear on the scanned image quite far away from where they ideally should be. To correct for this, most existing form systems require the use of registration marks, which are easily recognized and placed at known locations within the form. The form interpreter first finds these marks, and then, on the basis of the difference between the actual locations of the registration marks and where they are supposed to be, computes a simple geometric transformation. This transformation describes a mapping from the active areas' ideal locations to their actual locations on the instance of the form being scanned, so that the active mark areas can now be located accurately.

An example of a machine readable form is described in U.S. Pat. No. 5,060,980 entitled "Form Utilizing Encoded Indications For Form Field Processing" which is assigned to the assignee of the present invention (hereinafter the '980 patent). In FIG. 1 of the '980 patent a reference point 16 is disclosed. The reference point 16 is identical in function to the registration mark described herein (see column 6, lines 26–35 of the '980 patent for a description of reference point 16.)

The use of static predefined registration marks has two limitations. First, the registration marks clutter the form and constrain its design (they are invariably very graphically intrusive). Second, since these marks must be in known locations, the form designer must not move them. This means that it is difficult to build forms that contain these marks in standard page layout systems, since it is difficult in any such system to constrain the form designer's actions to ensure that they do not accidentally destroy the precise positioning of registration marks. Thus, it would be desirable to have a machine readable form that does not require the placement of static registration marks.

SUMMARY OF THE INVENTION

A forms creation and processing system which identifies and locates the active areas of a machine readable form using form landmarks is disclosed. The active areas of a machine readable form, such as a checkbox or a signature box may contain a user created mark. A forms interpreter will examine the active areas of a form to determine if a mark has been placed thereon. To identify active areas, the present invention utilizes form registration information (i.e. the landmarks) that is inferred from the arbitrary graphic elements that make up the form itself. Special registration marks are not needed. This allows unconstrained form design and the use of a much wider range of software tools to design such machine readable forms. In addition, the present invention makes it possible for many existing forms to be made machine readable without redesign.

In the present invention, after a form is laid out it is preanalyzed. The aim of the preanalysis is to infer from the arbitrary graphics in the form a set of graphic characteristics, i.e. landmarks, that can be found again on future scanned images of the form independent of their location or orientation in the image. The analysis looks at the geometric distribution and regularities of the form's graphic components to choose a set of landmarks. Examples of such landmarks could include paragraphs of text, heavy black lines or gray scale areas. A description of each landmark (or some subset of them) along with location and semantic information about the active areas is written to a form control file which is used by a forms interpreter to process the form.

When an instance of the form is interpreted by the forms interpreter, it is scanned and a set of instance landmarks is identified. Using the created forms control file, the forms interpreter compares this set of instance landmarks to the original landmarks specified in the forms control file. By determining a correspondence between these two sets of landmarks, the forms interpreter is able to determine a transformation (shift and/or scaling) that has taken place from the ideal form image used in the preanalysis to the instance scanned form image. This transformation information is then used to adjust the active areas locations extracted from the form control file to allow the form interpreter to correctly find and then read the active areas of the scanned form image.

DETAILED DESCRIPTION OF THE PREFERRED EMBODIMENTS

A forms creation and processing system which identifies and locates the active areas of a form using form landmarks is disclosed. In the following description numerous specific details are set forth, such as programming techniques for specifying active areas in a forms creation program, in order to provide a thorough understanding of the present invention. It would be apparent, however, to one skilled in the art to practice the invention without such specific details. In other instances, specific implementation details, such as scanning technologies to create a bit-mapped representation of a form, have not been shown in detail in order not to unnecessarily obscure the present invention.

Machine Readable Form Of the Currently Preferred Embodiment

Figure 1:
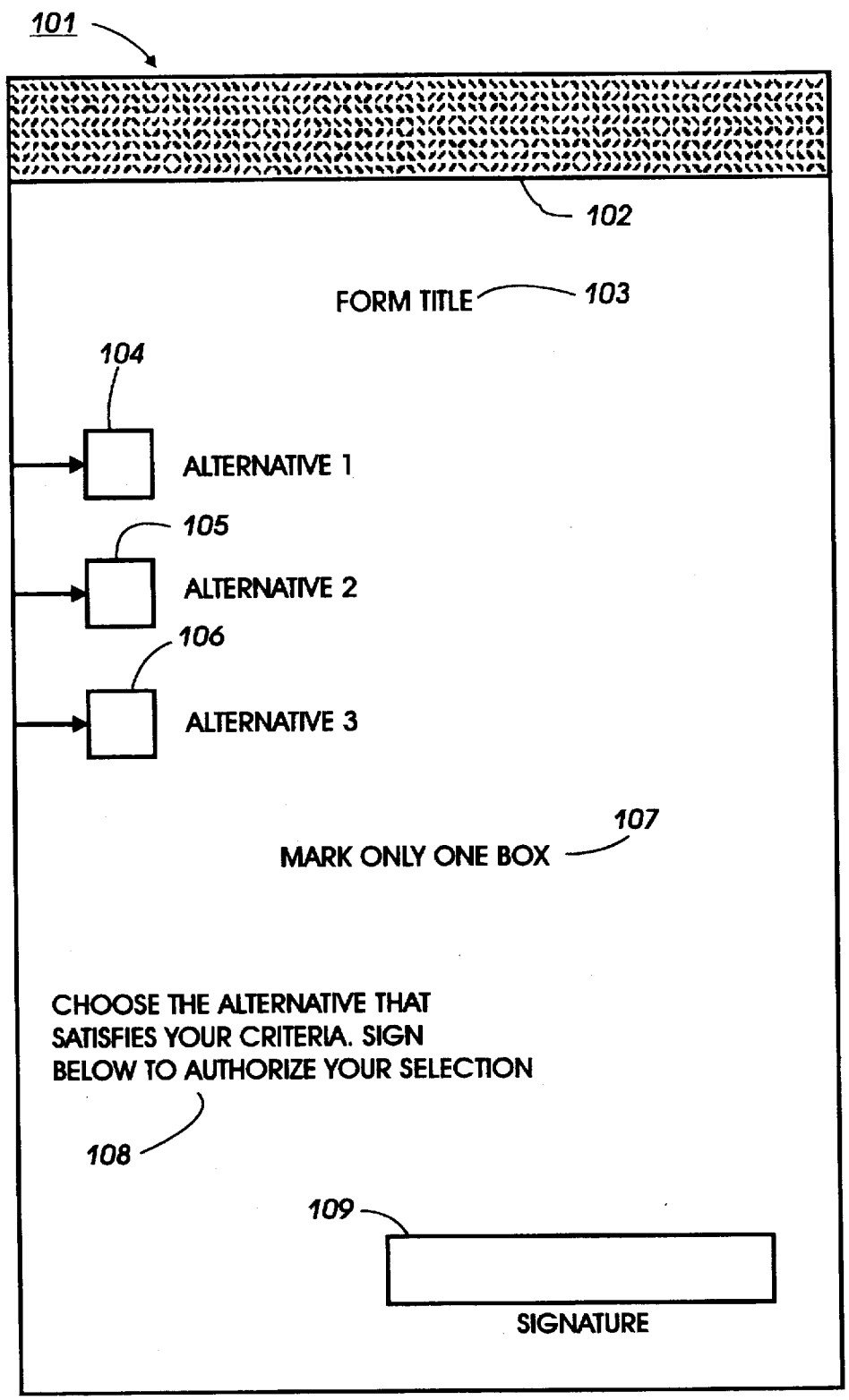
FIG. 1 is is an example of a machine readable form having active areas that may be created and processed by the currently preferred embodiment of the present invention.

FIG. 1 illustrates a simple example of a machine readable form. Referring to FIG. 1, a form 101 is comprised of an embedded data region 102, a form title 103, checkboxes 104–106 having accompanying text descriptions, a first block of textual instructions 107 having the text "Mark Only One Box", a second block of textual instructions 108 having the text "Choose the Alternative That Satisfies Your Criteria, Sign Below to Authorize Your Selection", and a signature box 109. Associated with each of the checkboxes 104–106 of form 101 is a rectangular box. This box is a graphical cue indicating where a mark can be made that would be subsequently recognized and processed accordingly. Note that other graphical cues, e.g. circles or lines, can also be used. The embedded data region 102 can be used to provide various information about the form. One embedded data encoding technology that may be used is described in U.S. Pat. No. 5,168,147 entitled "Self-Clocking Embedded Digital Data", Bloomberg, which is assigned to the assignee of the present invention.

An application that would process instances of the form 101 may be one that simply counts the number of times each of the checkboxes has been "checked" off (i.e. contains a mark), determines that only one checkbox has been marked per form and that a form being processed has been signed. The application may or may not verify that the signature is valid. Validation of signatures is beyond the scope of the present invention, so no further detail on such validation techniques is provided.

The active areas in form 101 are denoted by the rectangular boxes of checkboxes 104–106 and signature block 109. The active area refers to a location on a completed instance of a form that a form interpreter will examine to determine if it has been marked.

It should also be noted that the form 101 has various landmarks. By landmarks it is meant a visually distinguishable component of the form. The embedded data region 102, title 103 and text blocks 107 and 108 could be used as landmarks for the form (although because of differences in instances of forms, these regions may not always be identified as separate landmarks). It is through the analysis of spatial transformations between the instance form landmarks and the landmarks of the preanalyzed "original" form that the actual location of active areas of an instance of a form are found.

Overview of the Currently Preferred Embodiment

The currently preferred embodiment of the present is implemented as a set of software programs operating on a computer based system. The software programs represent tools for processing of machine readable forms. Such a set of software programs is commonly referred to as a "toolkit". The toolkit provides processing services to software applications for preanalyzing a composed machine readable form. The "toolkit" also provides processing services to software applications which process instances of the created machine readable forms. The processing services related to the present invention include software for scanning the forms and extracting data out of the scanned forms. Other processing services such as software for performing various image processing functions or for analyzing optically encoded data may also be provided.

Figure 2:
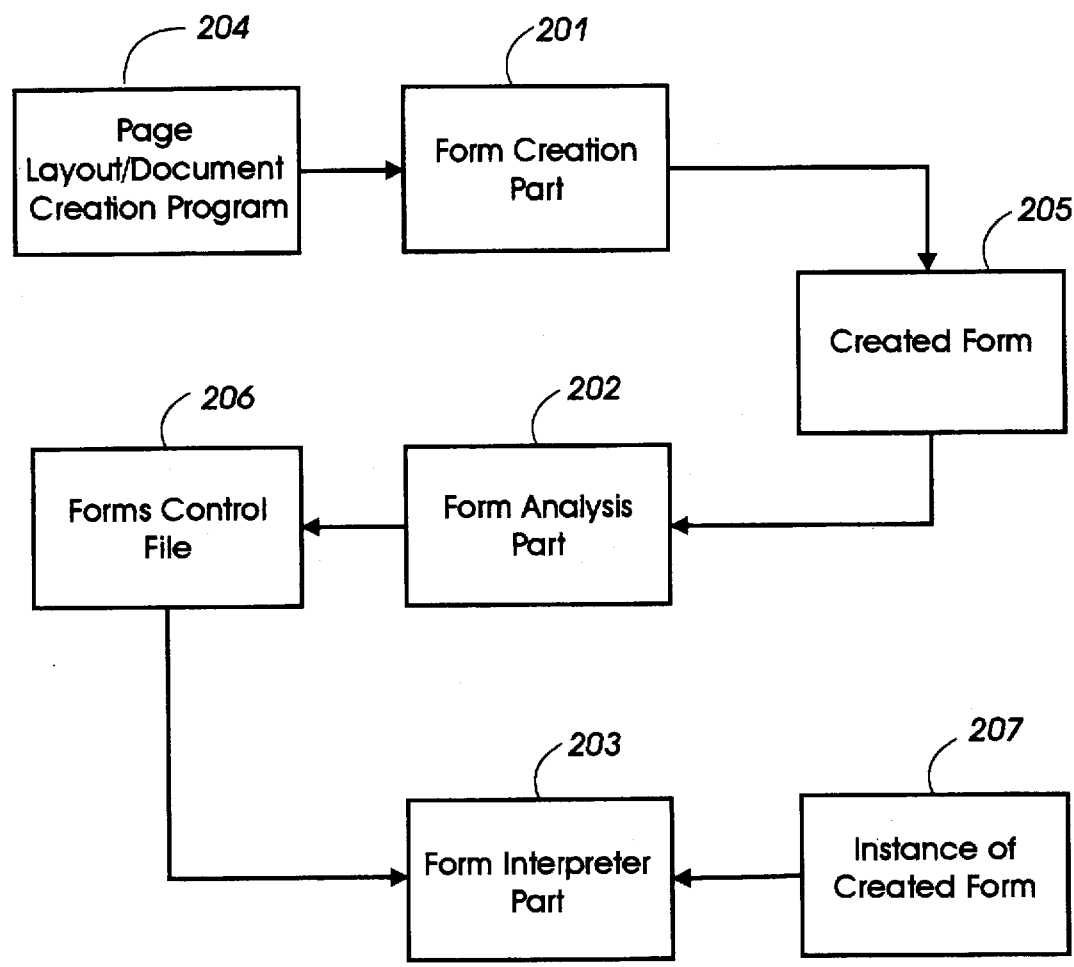
FIG. 2 is a block diagram of the functional components of a toolkit for creating and interpreting machine readable forms of the currently preferred embodiment of the present invention.

The toolkit embodiment of the present invention is illustrated in FIG. 2. The toolkit is comprised of a form creation part 201, a form analysis part 202 and a forms interpreter part 203. The form creation part 201 will preferably work in combination with a page layout or other document creation program 204, e.g. the Microsoft Word program available from the Microsoft Corporation of Bellevue, Wash., to create a form 205. Alternatively, the form creation part may be a standalone program. In any event, the form creation part will enable insertion of the necessary control information so that "active areas" on a form can be defined.

The form analysis part 202 is preferably a software program which takes as input, a representation of the form 205 and a description of the active areas on a form and creates a forms control file 206. In the currently preferred embodiment, the forms control file 206 contains active area and landmark information for the form 205.

Preferably, the form interpreter part 203 is called by an application program to extract data out of an instance of the form. Such data may be the detection of the absence or presence of a marks in the active areas.

Each of the foregoing parts will be described in greater detail below.

Form Creation

As noted with respect to the prior art, prior systems for reading machine readable forms required the presence of static and predefined registration marks. The present invention eliminates the need of such registration marks. The form creation part of the present invention may work with a suitable page layout or document editing program to create new machine readable forms. The created machine readable form may be newly composed or a conversion of an existing non-machine readable form.

In the currently preferred embodiment of the present invention, active areas are specified via form control objects. A form control object is an object that is inserted at a specific location of a form being created, typically in connection with the use of a document layout or document creation program. In the currently preferred embodiment, a feature of the Microsoft Windows TM Operating system known as Object Linking and Embedding (OLE) is utilized to embed forms control objects in a form. The OLE feature is supported by word processing program such as Microsoft Word. As the form is being created, when it is desirable to insert a form control object, a word processing command is selected which will enable the insertion of an object. The type, name and size of corresponding active area is specified. Once the form control object is defined, text corresponding to the form control object is entered. This process is repeated for all the desired form control objects on the form.

Various techniques may be used to convert an existing form to be machine readable. If the existing form only exists in hardcopy form, a simple way is to create a scanned image of the existing form and then use an image editing program to specify and position the active areas. If a computer file exists for the existing form it may be as simple as using a suitably enabled document layout program to insert the appropriate forms control objects in the computer file.

Form Analysis

The result of form analysis is the forms control file. The forms control file is used by the forms interpreter for extracting data from a machine readable form, and in particular identifying markings that are present within the active areas of a form. In the currently preferred embodiment, the form analysis processes a "print file" representation of the form. The print file is created by a user initiated request to the computer based system to print the form. The computer system will then create a set of graphical commands which are interpreted by the printer when printing a document. In the currently preferred embodiment, the print file will also contain the forms control objects denoting the active areas. The forms control object will contain an identifier and type for the active area as well as graphical commands for rendering any graphical cues for the active area. The identifier is merely a name by which the active area can be later referenced. The type of active area is an indicator of what type of data would be located therein (e.g. a checkbox would contain some handwritten check symbol, and a signature box would contain a signature). Ultimately, a bit-mapped representation of the form is generated internally which is then used to drive the form analysis. As described in detail below, the form analysis of the present invention evaluates the created bit-mapped representation using various image processing techniques to identify landmarks.

Figure 3:
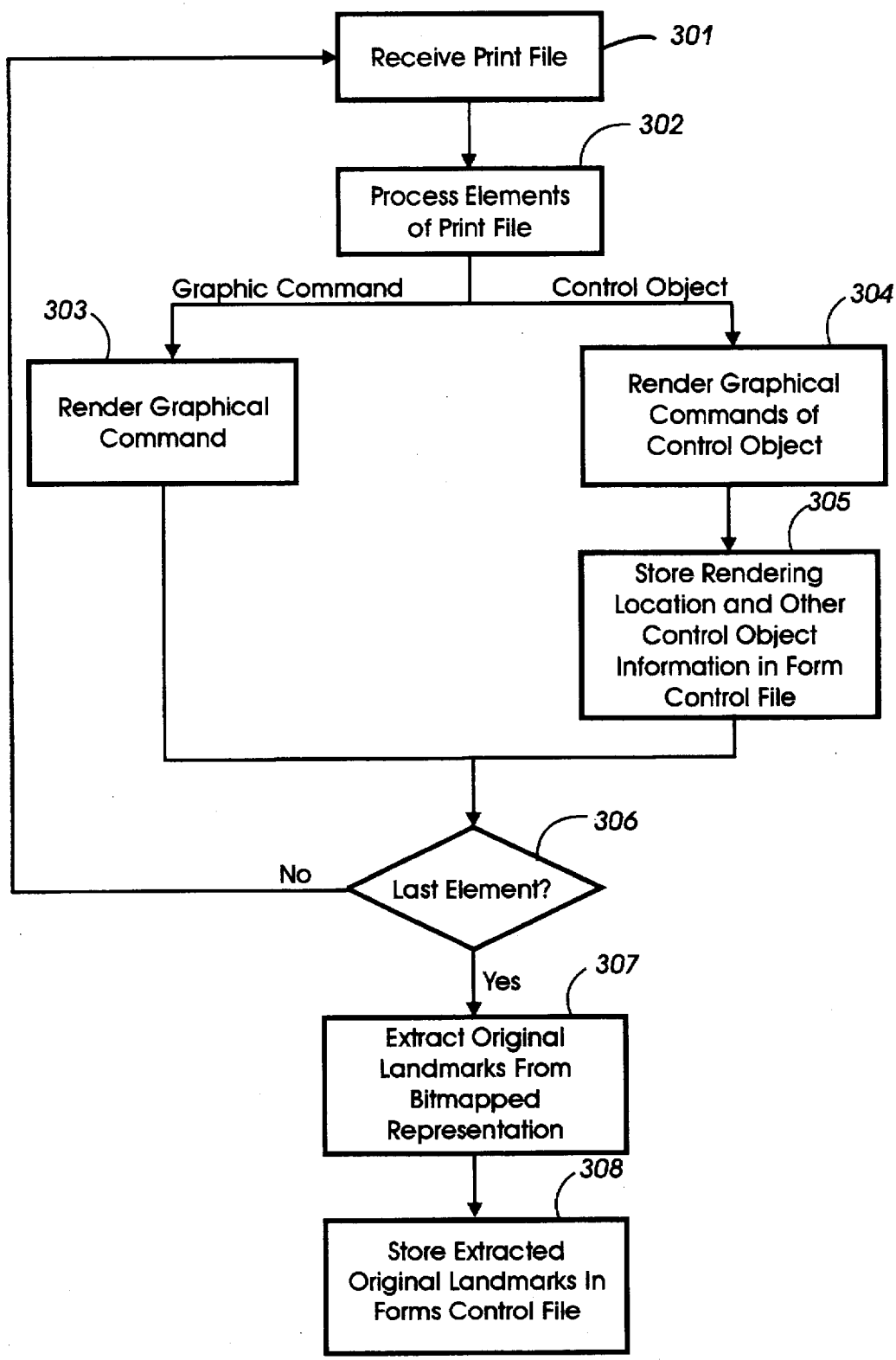
FIG. 3 is a flowchart illustrating the basic steps of form analysis as may be performed in the currently preferred embodiment of the present invention.

FIG. 3 illustrates in greater detail the steps performed in form analysis. First, the "print" file is received, step 301. As noted above, the print file is comprised of a list of graphical commands and form control objects. In the currently preferred embodiment the "print" file is used to render a a 300×300 dots per inch (dpi) resolution image. Each of the respective elements of the print file are then processed, step 302. A determination is made as to whether the element is a graphic command or a form control object. If a graphic command, the graphic command is executed, step 303. By executing the graphic command, a portion of the form is rendered. If it is a form control object, then the rendering location for the form control object is noted as an active area. The form control object is then rendered, step 304. The rendering location for the form control object is then saved in the forms control file, step 305. The location is stored in terms of the distance from the upper left hand corner of the form page rather than in terms of pixel locations. A check is then made to determine if it was the last graphic element in the print file, step 306. If it is not, the next command is processed per step 302. If it is the last element, then landmark extraction is performed on the resulting bit-mapped representation of the image, step 307. Landmark extraction is described in detail with respect to the flowchart of FIG. 4. Once the landmarks are extracted they are saved in the forms control file, step 308. The landmark information includes identities for types of landmarks, the location of the landmarks and a list of the landmarks. As will be described below, the forms control file can be stored in various places for access by a forms interpreter.

Figure 4:
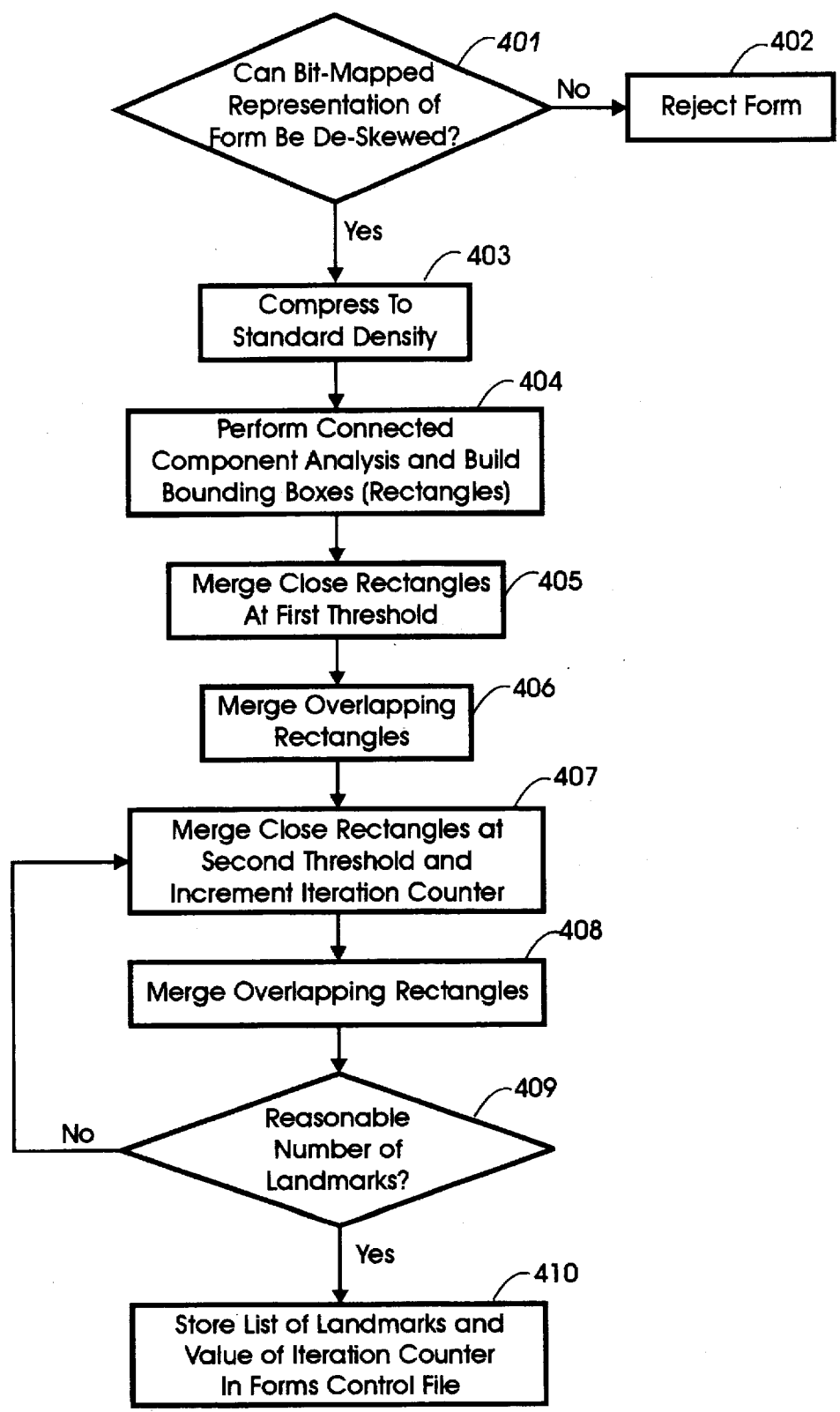
FIG. 4 is a flowchart illustrating the steps for landmark extraction as may be performed in the currently preferred embodiment of the present invention.

Referring now to FIG. 4, landmark extraction begins with a determination as to whether the bit-mapped representation of the form has enough information (e.g. text or graphical data) so that it can be de-skewed, step 401. This determination is made to insure the integrity of subsequent forms processing. It has been determined that a bit-mapped image that cannot be de-skewed is susceptible to errors during form processing. If it is determined that the form cannot be de-skewed, the form is rejected, step 402. Otherwise, the bit-mapped representation is then converted to a "standard" page density, step 403. In the currently preferred embodiment, the 300×300 dpi image of the form is "reduced" to a 100×100 dpi image. It has been determined that processing at this "standard" density level reduces errors that may be introduced by the various resolutions used by printing and scanning elements. This reduction occurs via a thresholding method where each 3×3 pixel array will be reduced to a single value based on the count of the on/off pixels in the 3×3 pixel array.

Using the compressed representation of the form, a connected components analysis is performed and bounding boxes created, step 404. A connected component analysis refers to grouping pixels based on whether adjacent pixels are in the same state (i.e. on, or black). Such connected component analysis is widely used in many document analysis tasks, e.g. Optical Character Recognition. The result here will be to have rectangles at the character level. These rectangles are merged with other close rectangles, step 405. This will result in rectangles at the "word" level. The "closeness" is determined by a first threshold value. Next, overlapping rectangles are merged, step 406. This will result in a collection of word-sized non-overlapping rectangles.

At this point, the larger form characteristics are identified. First, close rectangles are merged, this time according to a second threshold and an iteration counter is incremented, step 407. As will be described below, this step may be repeated depending on the number of rectangles currently extracted. Overlapping rectangles are merged to create an initial landmark list, step 408. It is then determined if a reasonable number of landmarks have been identified, step 409. This determination looks first to see if less than a predetermined number (e.g. 10) have been identified, or if the difference in landmarks created between iterations is less than another predetermined threshold (e.g. less than 10%). In any event, if the number of landmarks is not reasonable, further rectangle merging takes place per step 407. Otherwise, the list of landmarks and the value of the iteration counter is stored in the forms control file, step 410. The landmarks in the form control file are referred to as the "original" landmarks. The iteration counter is used to provide information to the forms interpretation part as to the number of times the step corresponding to step 407 should be performed.

Figure 5:
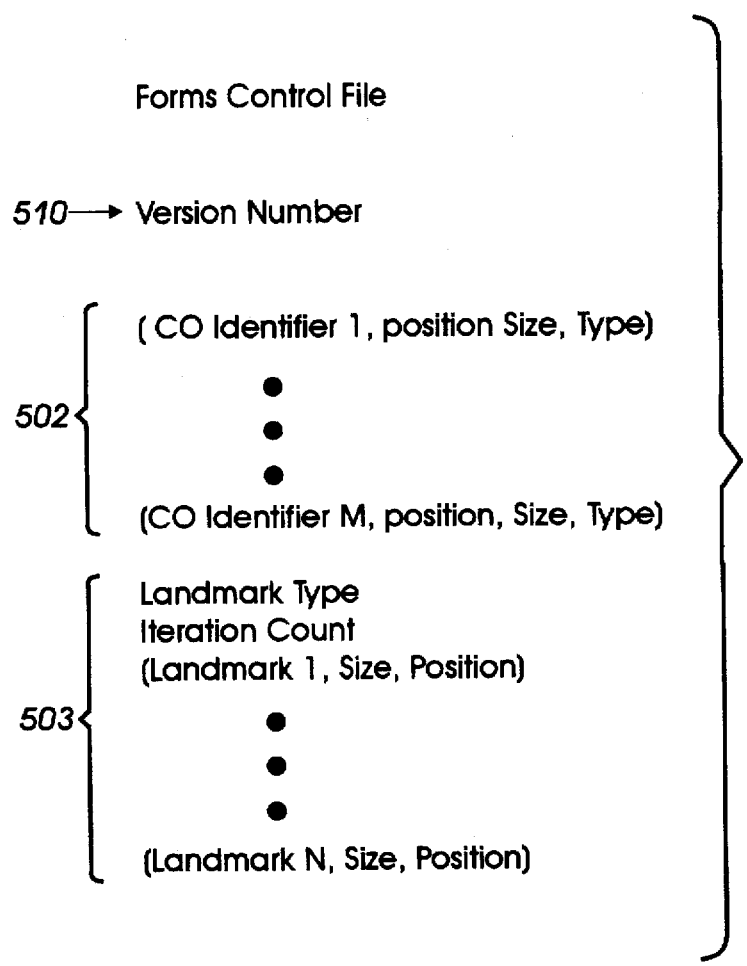
FIG. 5 is an example of a forms control file in the currently preferred embodiment of the present invention.

FIG. 5 illustrates the forms control file of the present invention. The forms control file contains a version number 501, a list of forms control objects 502, and the landmark information 50. Each forms control object will be comprised of a control object identifier, position, size and type. The landmark information 503 is comprised of a specification landmark type, the iteration count and a list of landmarks. Each of the landmarks will specify a size and a position.

Form Interpreter

Figure 6:
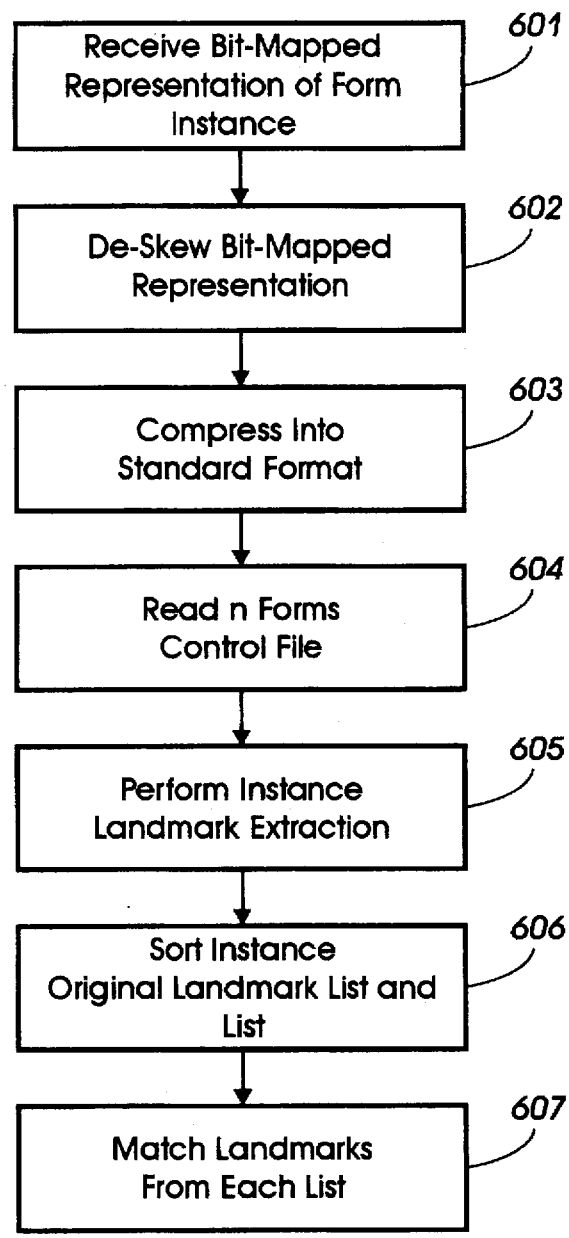
FIG. 6 is a flowchart illustrating the steps for form interpretation as may be performed in the currently preferred embodiment of the present invention.

The form interpreter of the currently preferred embodiment is typically called from within an application program which processes the form to identify any marks contained in the active areas of the form. The form interpreter will identify the location of active areas, determine the existence of marks in the active areas and then pass that information to the application program. FIG. 6 is a flowchart describing the steps performed by the form interpreter in "reading" information from a form. First, a bit-mapped representation of the form is obtained, step 601. The bit-mapped representation of the form is typically the output from a scanner. This bit-mapped representation of the form is then de-skewed, step 602. By de-skewing it is meant that any skew distortions introduced by the scanning process, or in the reproduction of the form, are corrected. Next, the skew corrected representation is "reduced" to the standard format, step 603, and the forms control file read in, step 604. It should be noted that the form control file may be obtained in various alternative ways. For example, the forms control may be encoded within the form itself and then extracted when the form is processed. Or the forms control file may be permanently stored in a storage means coupled to the computer based system processing the form. Or the forms control file could be acquired via some network connection and ephemerally stored while the form is being processed. Implementation of such varied techniques would not depart from the spirit and scope of the present invention.

Landmark extraction is then performed to find "instance" landmarks, step 605. The identification of landmarks is via a process substantially similar to the steps described with reference to FIG. 4. The step of finding "close" rectangles is performed the number of times specified in the iteration value and the various threshold values are the same as in the preanalysis. In any event, at this point a list of "instance" landmarks and a list of "original" landmarks have been created. Note that there need not be the same number of landmarks in the "instance" and "original" lists. This is because of potential differences in the bit-mapped representation of the form as analyzed and the scanned form. Anyway, the instance and original landmark lists are sorted based on their position with respect to the upper left hand corner of the form page, step 606. The landmarks in each list are then "matched" or paired, step 607. The criteria for obtaining such matches is based on the shape and locations of the landmarks. Note that it is not necessary that each landmark in a list be paired. So long as a suitable number of matches occur, the identification of the active areas on the instance of a form can be determined. At this point the active areas in the instance of a form can be examined. In the currently preferred embodiment, examination of an active area must be explicitly requested by a forms processing application. The processing of each request is described with respect to FIG. 7.

Figure 7:
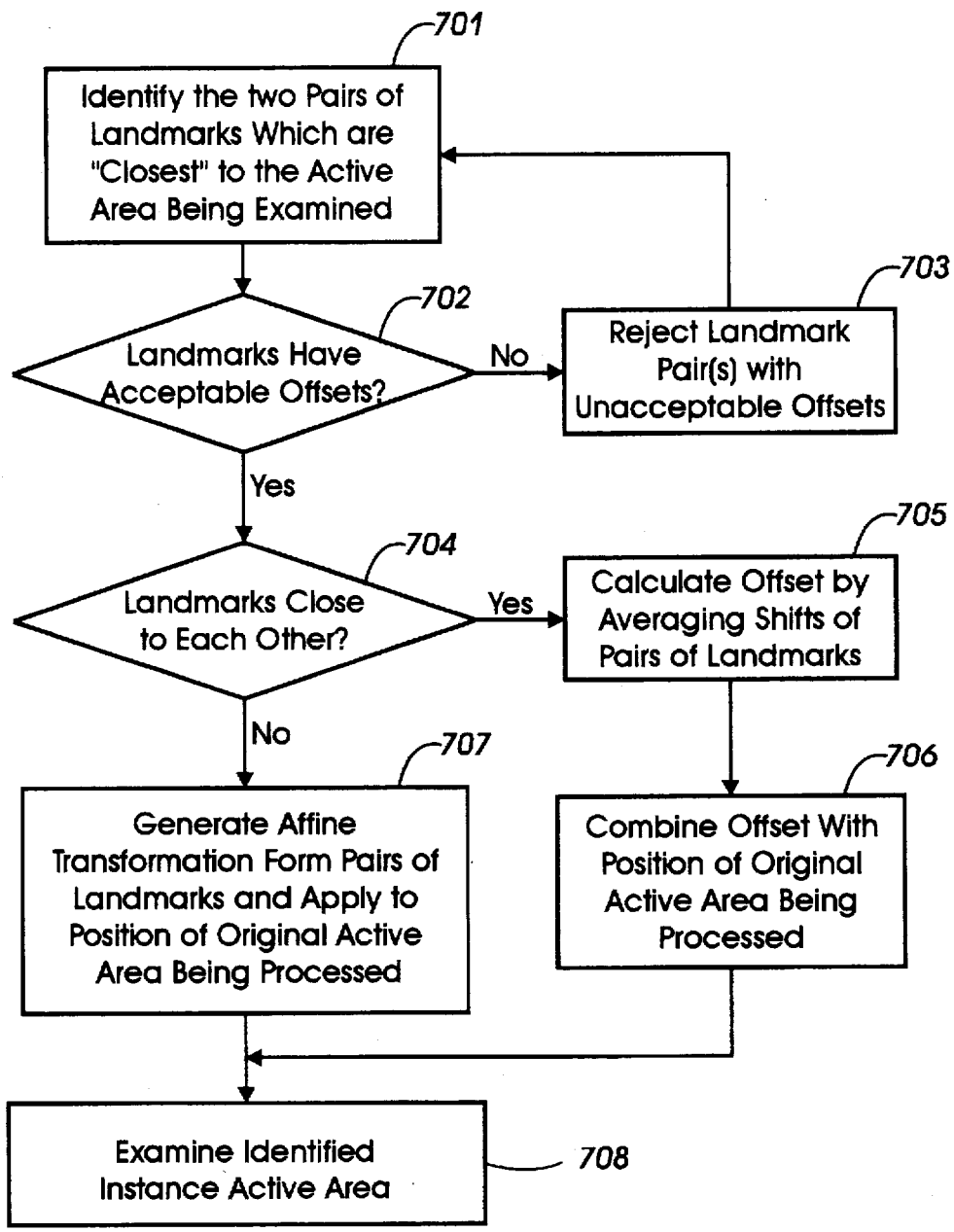
FIG. 7 is a flowchart illustrating the steps for determining the location of the the active areas of an instance of a form as may be performed in the currently preferred embodiment of the present invention.

Referring to FIG. 7, first two pairs of landmarks are identified which are "closest" to the active area being examined, step 701. The determination of "closest" is made by comparing the spatial locations for the active areas and the "original" landmarks from the forms control file. It is then determined if the selected pairs of landmarks have acceptable offsets, step 702. Unacceptable offsets may occur if a landmark's position is shifted from its original position by an amount much greater than the average shift for all the landmarks. In any event, if a landmark does not have an acceptable offset, that landmark is rejected and will not be subsequently used, step 703. The processing will then go back to step 701 using the remaining landmarks. If the offset is acceptable, a determination is made if the landmarks are "close" to the original active area position, step 704. If they are close, the offset is obtained by averaging the resulting shifts in the pairs of landmarks, step 705. The offset value is then combined with the original active area location to create the location to be examined, step 706. If they are not close, the area to be examined is determined by the creation of an affine transformation from a coordinate system space defined by the original form to a coordinate system space defined by the scanned in instance form, step 707. This affine transformation is then applied to the active area information in the forms control file. In any event, the corresponding area is examined, step 708. Examination may merely be the detection of any marks (e.g. "On" pixels) in the corresponding area. This process is repeated for each active area to be examined.

Figure 8:
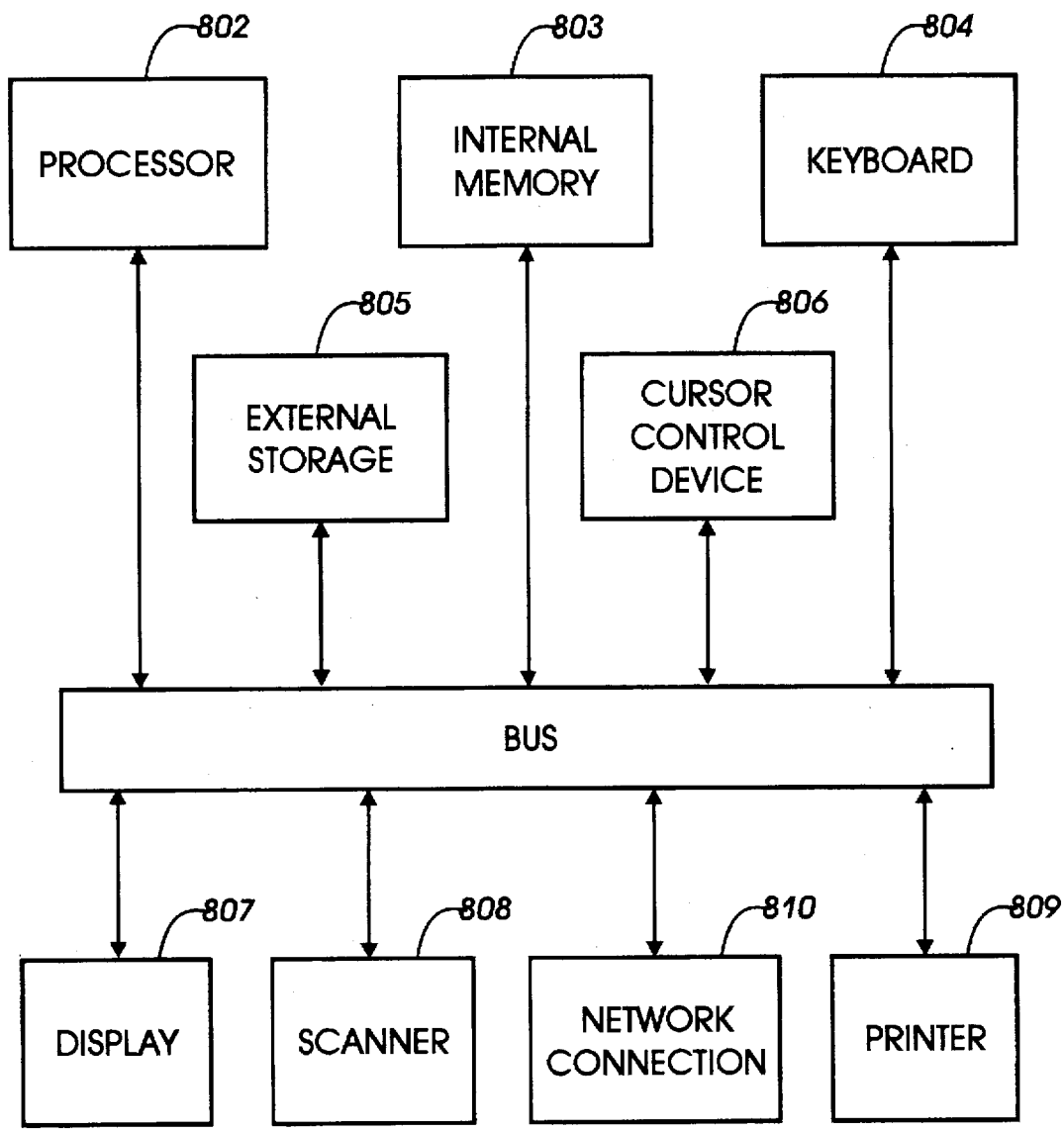
FIG. 8 is a block diagram of a computer based system as may be utilized in the currently preferred embodiment of the present invention.

Overview of a Computer Based System In the Currently Preferred Embodiment of the Present Invention The computer based system on which the currently preferred embodiment of the present invention may be implemented is described with reference to FIG. 8. Referring to FIG. 8, the computer based system is comprised of a plurality of components coupled via a bus 801. The bus 801 is typically comprised of a plurality of parallel buses (e.g. address, data and status buses) as well as a hierarchy of buses (e.g. a processor bus, a local bus and an I/O bus). In any event, the computer based system is further comprised of a processor 802 for executing instructions provided via bus 801 from internal memory 803 (note that the internal memory 803 is typically a combination of Random Access or Read Only Memories). The processor 802 and internal memory ROM 803 may be discrete components or a single integrated device such as an Application Specification Integrated Circuit (ASIC) chip.

Also coupled to the bus 801 are a keyboard 804 for entering alphanumeric input, external storage 805 for storing data, a cursor control device 806 for manipulating a cursor, and a display 807 for displaying visual output. The keyboard 804 is typically a standard QWERTY keyboard but may also be telephone like keypad. The external storage 805 may be fixed or removable magnetic or optical disk drive. The cursor control device 806 will typically have a button or switch associated with it to which the performance of certain functions can be programmed. Further coupled to the bus 801 is a scanner 808. The scanner 808 provides a means for creating a bit-mapped representation of a hardcopy instance of a form.

Optional elements that could be coupled to the bus 801 would include printer 809 and network connection 810. The printer 809 could be used to print a machine after it has been created. The network connection 810 could be used to enable use of the present invention over a network. For example, a scanned image of an instance of a form could be directed to a system having the necessary forms interpreter needed for analysis.

It should be noted that the computer based system on which a machine readable form and corresponding forms control file are created and the computer based system upon which the forms interpreter resides need not be the same.

EXAMPLE

Figure 9:
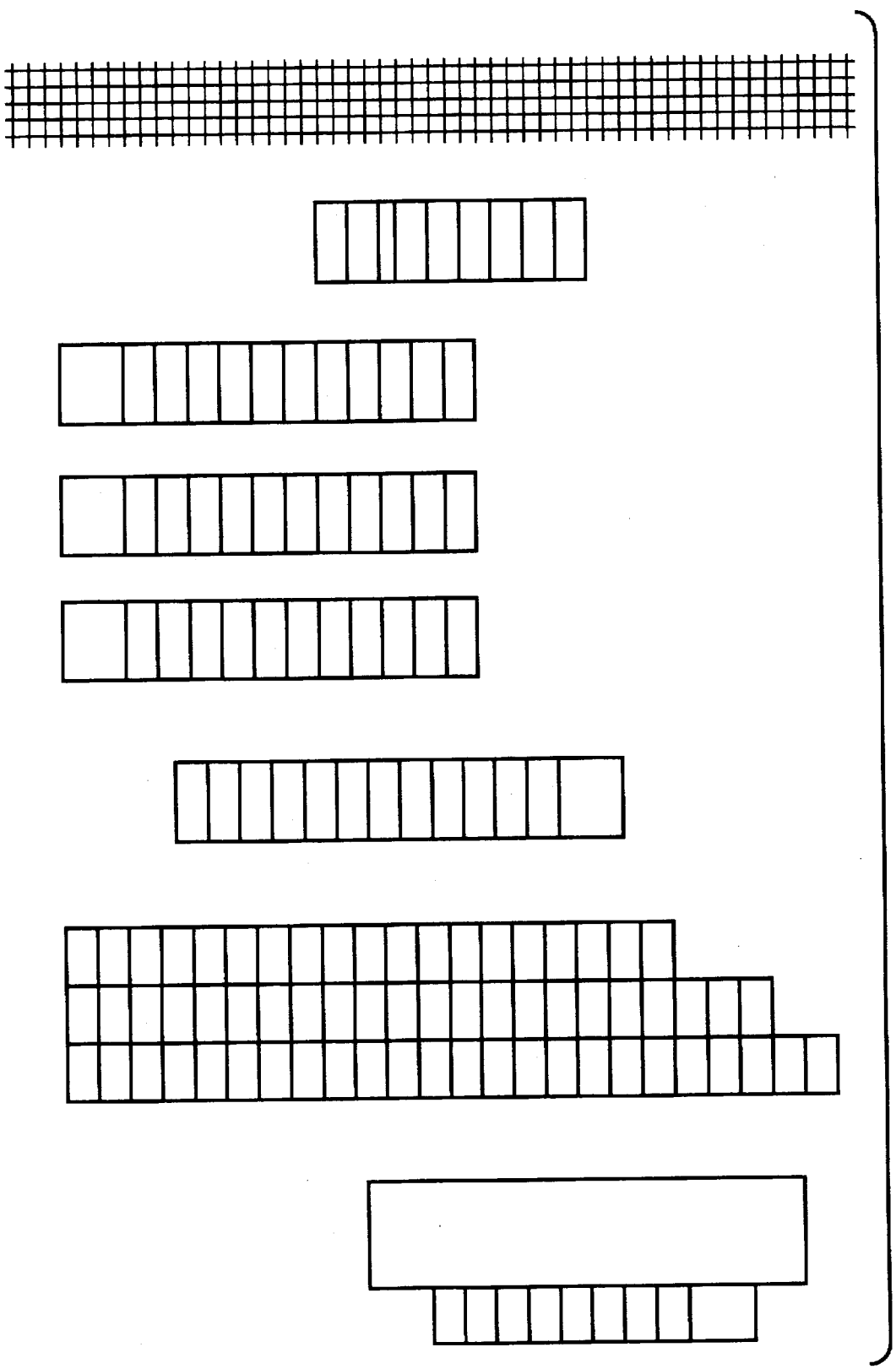
FIGS. 9–11 are used to illustrate an example of the states of the machine readable form of FIG. 1 as it undergoes the landmark extraction as performed in the currently preferred embodiment of the present invention.
Figure 10:
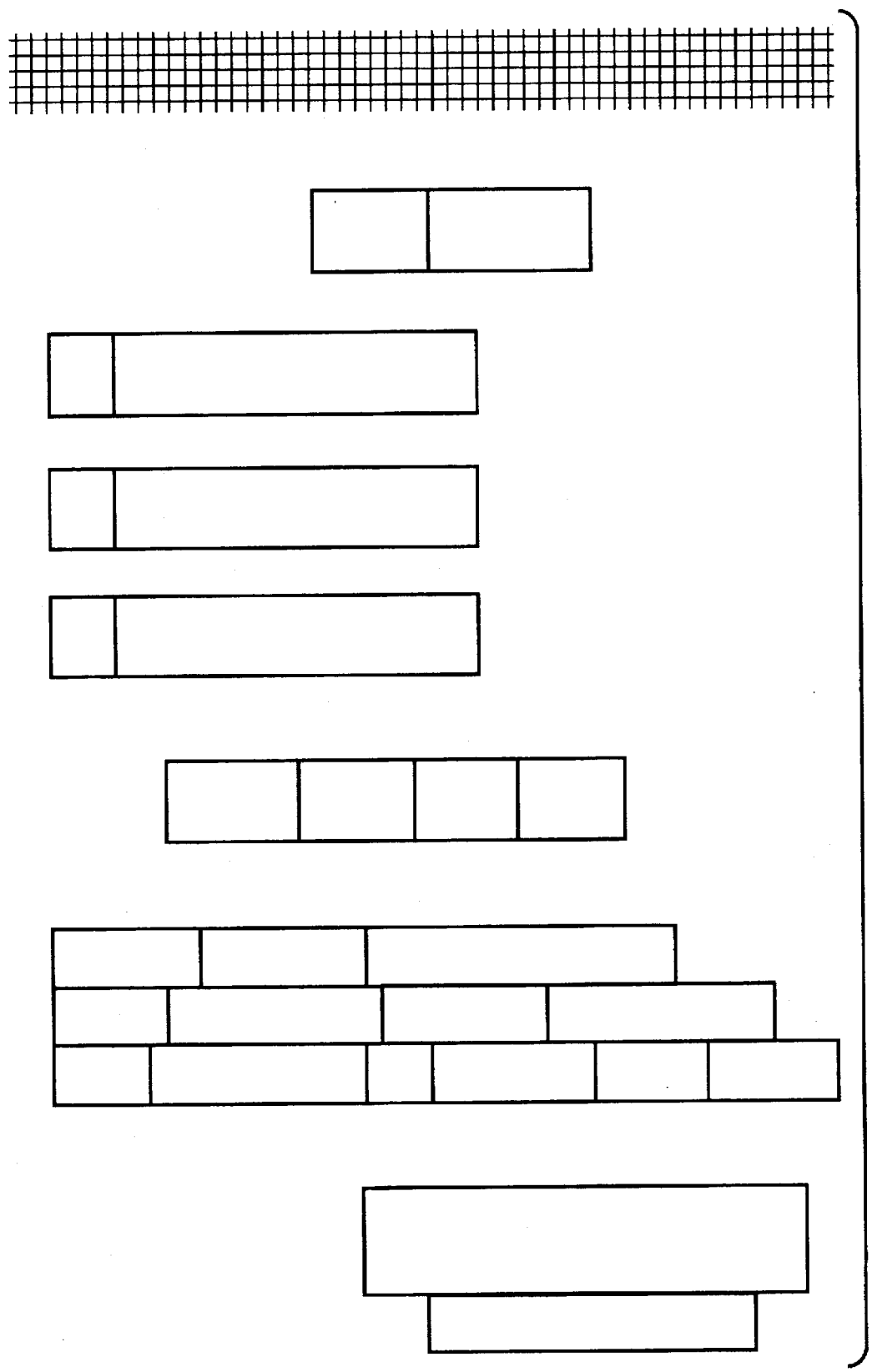
Figure 11:
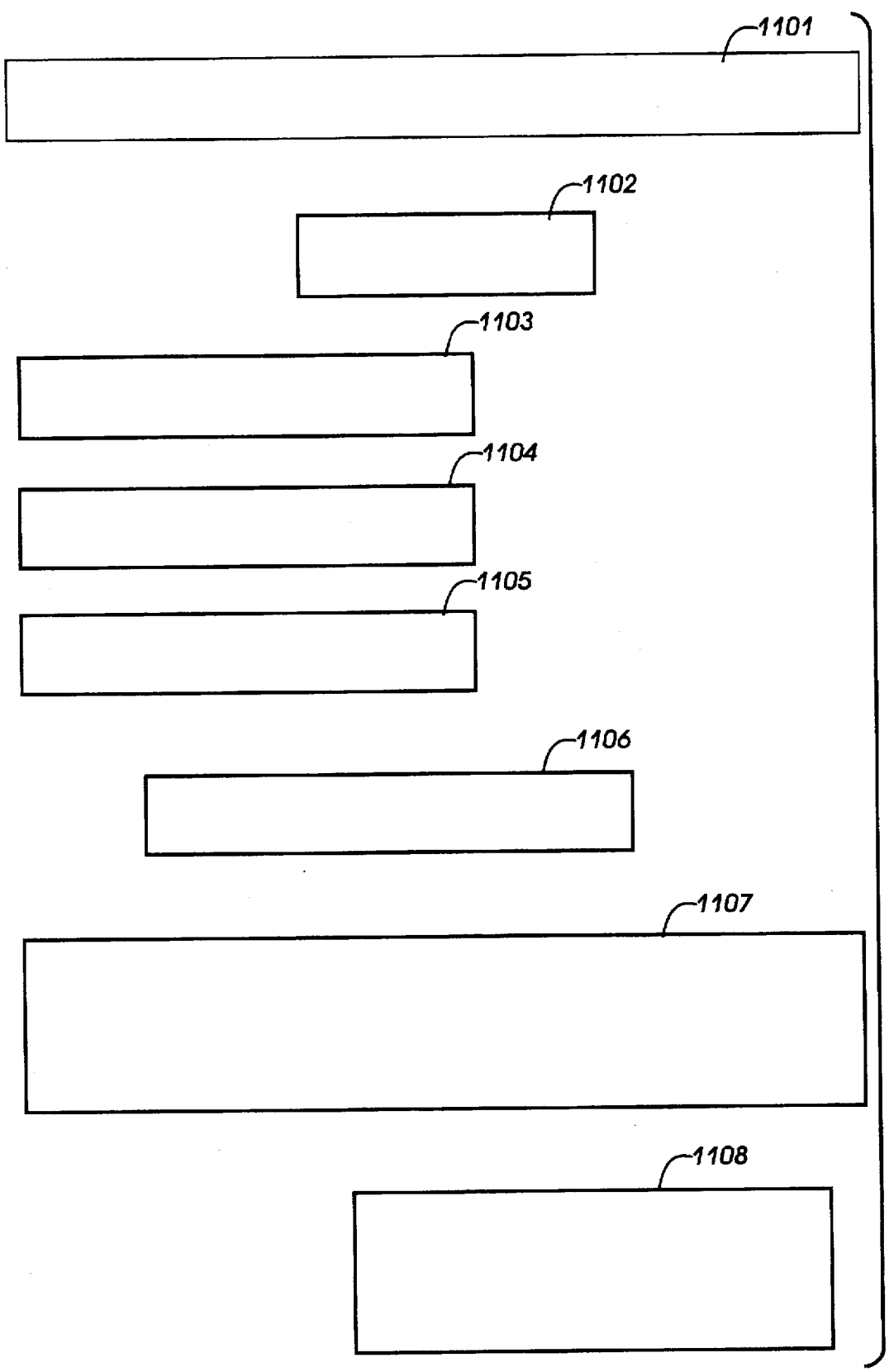

The present invention is further described in an example wherein the landmarks of the machine readable form of FIG. 1 are extracted. It should be noted that landmark extraction of the present invention is analogous to various techniques which have been developed to analyze a bit-mapped representation of a medium to identify the structure of the medium in terms of blocks. FIG. 9 is a representation of rectangles after the connected component step described with respect to step 404 of the flowchart of FIG. 4. At this point, each of the rectangles will represent a character, or at least a portion of a character. FIG. 10 illustrates the merging of rectangles wherein groupings such as words have been identified (as may be created in the step 405 of FIG. 4). Finally, FIG. 11 illustrates further groupings wherein rectangles have been merged. The blocks of FIG. 11 indicate potential landmarks, indicated as blocks 1101–1108.

Figure 12:
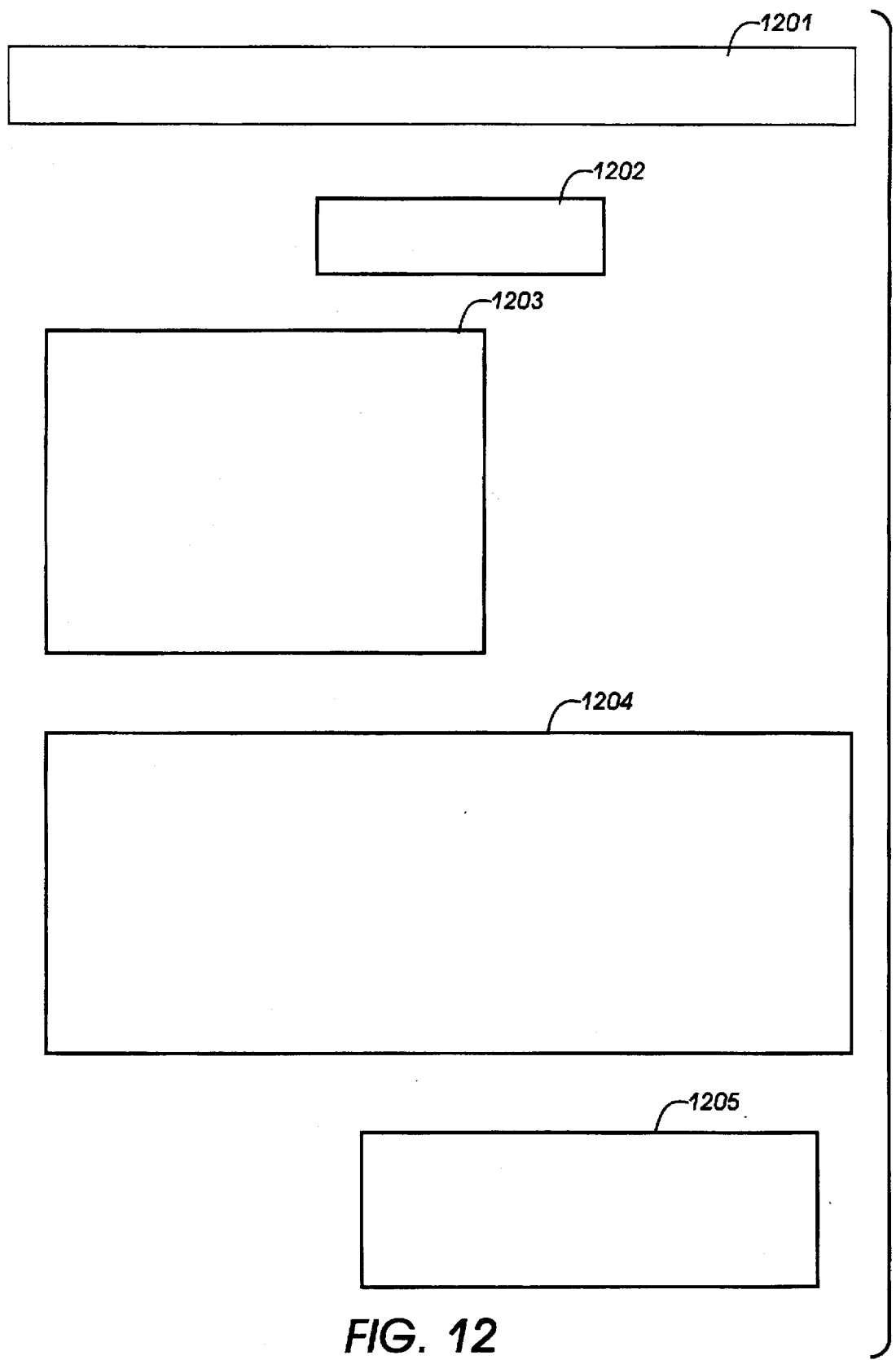
FIG. 12 is an example of landmarks extracted from an instance of the machine readable form of FIG. 1.

FIG. 12 illustrates an instance of the machine readable form of FIG. 1 wherein the landmarks have been identified. For various reasons, the instance of the form has created a set of landmarks that are different than those of FIG. 11. FIG. 12 only has five landmarks (landmarks 1201–1205). It should be noted that the landmarks may have different shapes. Further, the identified landmarks will typically have different spatial locations. In FIG. 12, the areas of text and the checkboxes have merged into a single landmark. Similarly, the text containing instructions for completing the form have merged a form a single landmark.

Pairing the landmarks yields the following: landmark 1101 is paired with landmark 1201, landmark 1102 is paired with landmark 1202, and landmark 1108 is paired with landmark 1205. Note that the landmarks 1103–1107 of FIG. 11 and landmarks 1203 and 1204 are not paired. This is because they do not meet requisite location and shape criteria for the matches.

Using the above information, the areas on the instance of the form are now examined to determine if there are any markings. So assuming that the spatial information for an active area A representing the first alternative has been received. The two closest pairs of landmarks are the pairs 1101/1201 and 1102/1202. Here, the two pairs of landmarks are "close" so the offset is determined by the average of the translation inferred from the two different landmarks. The shift by landmark 1101 to 1201 is denoted by (dx1, dy1) and the shift by landmark 1102 to 1202 is denoted by (dx2, dy2). So the offset (or shift) for the active area A is computed as ((dx1+dx2)/2, (dy1+dy2)/2). Combining this offset with the spatial location specified in the forms control file results in the location of the active area in the instance of the form to be examined. This examination will span the entire active area defined.

As noted above, if the the landmarks are far apart, the area to be examined is determined by an affine transformation. The affine transformation is a standard mathematical calculation which calculates a mapping from one coordinate system (original form space) to another coordinate system (scanned form space). This transformation takes into account the rotation, scaling and translation from one space to the other. Once this transformation has been calculated one can use it to map a point from one of the coordinate systems to the other. In the present invention 3 points from the original landmarks and 3 points from the instance landmarks are used to calculate what this translation is. Based on this translation it is merely a mapping of the original rectangle for the active object to where it is in the scanned coordinate system.

Thus, a system and for active area identification on a machine readable form using form layout landmarks is disclosed. While the present invention is described with respect to a preferred embodiment, it would be apparent to one skilled in the art to practice the present invention with other configurations of document processing systems. Such alternative embodiments would not cause departure from the spirit and scope of the present invention.

What is claimed:

1. A method for identifying areas on an instance of a machine readable form to be examined for the presence of user made marks, said machine readable form void of predefined registration marks, said method comprising the steps of:
   a) creating said machine readable form by performing the sub-steps of:
      composing said machine readable form having one or more active areas;
      analyzing an image of said machine readable form to identify one or more original landmarks, said original landmarks including text blocks, graphic blocks, horizontal bars and vertical bars; and
      storing location and identifying information for said one or more original landmarks and said active areas in a forms control file;
   b) creating a bit-mapped representation of said instance of said machine readable form;
   c) analyzing said bit-mapped representation of said instance of said machine readable form to identify one or more instance landmarks, said instance landmarks including text blocks, graphic blocks, horizontal bars and vertical bars;
   identifying an active area in said instance of a machine readable form by performing the steps of:
   d) retrieving said forms control file;
   e) comparing said one or more original landmarks from said forms control file with said one or more instance landmarks to obtain pairings of original landmarks with instance landmarks based on location and shape;
   f) generating an offset based on said landmark pairings;
   g) applying said offset to location information in said forms control file of an active area being processed;
   h) examining said area identified in step g) as said active area.

2. The method as recited in claim 1 wherein said step of analyzing an image of said machine readable form to identify one or more original landmarks further comprises the steps of:
   b1) creating a bit-mapped representation of said machine readable form;
   b2) using a first process to identify said original landmarks for said machine readable form from said bit-mapped representation; and
   b3) storing first location information for said original landmarks in said forms control file.

3. The method as recited in claim 2 wherein said step of creating a bit-mapped representation of said instance of said machine readable form is further comprised of the step of de-skewing said created bit-mapped representation of said instance of said machine readable form.

4. The method as recited in claim 3 wherein said step of analyzing said bit-mapped representation of said instance of said machine readable form to identify one or more instance landmarks is performed using said first process.

5. The method as recited in claim 4 wherein said first process further comprises the steps of:
   a) reducing said bit-mapped representation to a predetermined standard resolution;

b) creating rectangles around areas of said reduced bit-mapped representation containing adjacent pixels having the same binary value;

c) performing the sub-steps of combining overlapping and close rectangles until a predetermined condition is achieved and a set of remaining rectangles have been created; and d) providing said set of remaining rectangles as landmarks.

6. The method as recited in claim 1 wherein said step of generating an offset based on said landmark pairings further comprises the steps of:

f1) identifying a first pair of landmarks and a second pair of landmarks that are closest to the active area being processed;

f2) determining if said first pair of landmarks and said second pair of landmarks are within a predetermined distance from said active area being processed;

f3) if said first pair of landmarks and said second pair of landmarks are within a predetermined distance from said active area being processed, determining said offset by averaging the distance between said first pair of landmarks and the distance between said second pair of landmarks;

f4) if said first pair of landmarks and said second pair of landmarks are not within said predetermined distance from said active area being processed, determining said offset by constructing an affine transformation function between said original landmarks of said first and second pairs of landmarks and said instance landmarks of said first and second pairs of landmarks and applying said affine transformation on said active area being processed.

7. The method as recited in claim 1 wherein prior to said step of analyzing said machine readable form to identify one or more original landmarks performing the steps of:

determining if said machine readable form can be de-skewed; and rejecting said machine readable form if said machine readable form cannot be de-skewed.

8. A method for locating active areas which may contain user created marks on an instance of a machine readable form, said machine readable form void of predefined registration marks, said method comprising the steps of:

a) receiving a forms control file associated with said instance of said machine readable form, said forms control file comprising a set of original landmarks of said machine readable form, said original landmarks including text blocks, graphic blocks, horizontal bars or vertical bars, said forms control file further comprising original position information for each active area on said machine readable form and an iteration count;

b) scanning said instance of a machine readable form to create a bit-mapped representation thereof;

c) analyzing said bit-mapped representation of said instance of a machine readable form to identify a set of instance landmarks, said instance landmarks including text blocks, graphic blocks, horizontal bars or vertical bars;

d) matching landmarks in said set of original landmarks with landmarks in said set of instance landmarks to create matched pairs of landmarks, said matching step based on predetermined spatial position and predetermined shape thresholds;

e) generating an offset based on said matched pairs of landmarks and original position information for an active area being processed; and f) applying said offset to said original position information for the active area being processed.

9. The method as recited in claim 8 wherein said step of analyzing said bit-mapped representation of said instance of a machine readable form to identify a set of instance landmarks further comprises the steps of:

c1) creating rectangles around areas of said reduced bit-mapped representation containing adjacent pixels having the same binary value; and c2) performing the sub-steps of combining overlapping and close rectangles a number of times specified by said iteration count to create said instance landmarks.

10. The method as recited in claim 9 wherein said step of matching landmarks in said set of original landmarks with landmarks in said set of instance landmarks to create matched pairs of landmarks is further comprised of the step of:

d1) for each original landmark, determining if an instance landmark exists that is within a predetermined spatial position and a predetermined shape threshold;

d2) if no such instance landmark exists, skipping said original landmark; and d3) if such instance landmark exists, pairing said original landmark with said instance landmark.

11. The method as recited in claim 10 wherein said step of generating an offset based on said matched pairs of landmarks and original position information for an active area being processed is further comprised of the steps of:

e1) identifying a first pair of landmarks and a second pair of landmarks that are closest to the active area being processed;

e2) determining if said first pair of landmarks and said second pair of landmarks are within a predetermined distance from said active area being processed;

e3) if said first pair of landmarks and said second pair of landmarks are within said predetermined distance from said active area being processed, determining an offset by averaging the distance between said first pair of landmarks and the distance between said second pair of landmarks; and e4) if said first pair of landmarks and said second pair of landmarks are not within said predetermined distance from said active area being processed, determining said offset by constructing an affine transformation function between said original landmarks of said first and second pairs of landmarks and said instance landmarks of said first and second pair of landmarks and applying said affine transformation on said active area being processed.

12. A forms processing system for identifying active areas in machine readable forms, said machine readable forms void of predefined registration marks, said forms processing system comprising;

a scanning device for scanning an instance of a machine readable form to create a bit-mapped representation thereof;

receiving circuitry for receiving a forms control file associated with said instance of said machine readable form, said forms control file comprising a set of original landmarks of said machine readable form, said original landmarks including text blocks, graphic blocks, horizontal bars or vertical bars, said forms control file further comprising original position information for each active area on said machine readable form;

first processing circuitry suitably adapted to provide functionality for analyzing said bit-mapped representation of said instance of a machine readable form to identify a set of instance landmarks, said instance landmarks including text blocks, graphic blocks, horizontal bars or vertical bars;

second processing circuitry suitably adapted to provide functionality for matching landmarks in said set of original landmarks with landmarks in said set of instance landmarks to create matched pairs of landmarks, said matching based on predetermined spatial position and predetermined shape thresholds;

third processing circuitry suitably adapted to provide functionality for generating an offset based on said matched pairs of landmarks and original position information for an active area being processed; and fourth processing circuitry suitably adapted to provide functionality for applying said offset to original position information for said active area being processed.

13. The forms processing system as recited in claim 12 wherein said third processing circuitry is further comprised of:

circuitry for identifying a first pair of landmarks and a second pair of landmarks that are closest to the active area being processed;

circuitry for determining if said first pair of landmarks and said second pair of landmarks are within a predetermined distance from said active area being processed;

circuitry for determining if said first pair of landmarks and said second pair of landmarks are within said predetermined distance from said active area being processed, determining an offset by averaging the distance between said first pair of landmarks and the distance between said second pair of landmarks; and circuitry for determining if said first pair of landmarks and said second pair of landmarks are not within said predetermined distance from said active area being processed, determining said offset by constructing an affine transformation function between said original landmarks of said first and second pairs of landmarks and said instance landmarks of said first and second pair of landmarks and applying said affine transformation on said active area being processed.

14. A program storage device readable by a machine, tangibly embodying a program of instructions executable by the machine to perform method steps for identifying active areas on a machine readable form, wherein said machine readable form is void of registrations marks, said method steps comprising:

b) receiving a bit-mapped representation of an instance of a machine readable form;

b) receiving a forms control file associated with said instance of said machine readable form, said forms control file comprising a set of original landmarks of said machine readable form, said original landmarks including text blocks, graphic blocks, horizontal bars or vertical bars, said forms control file further comprising original position information for each active area on said machine readable form;

c) analyzing said bit-mapped representation of said instance of a machine readable form to identify a set of instance landmarks, said instance landmarks including text blocks, graphic blocks, horizontal bars or vertical bars;

d) matching landmarks in said set of original landmarks with landmarks in said set of instance landmarks to create matched pairs of landmarks, said matching step based on predetermined spatial position and predetermined shape thresholds;

e) generating an offset based on said matched pairs of landmarks and original position information for an active area being processed; and f) applying said offset to said original position information for said active area being processed.

* * * * *